United States Patent
Mizhen

(10) Patent No.: US 8,793,166 B2
(45) Date of Patent: Jul. 29, 2014

(54) ON-LINE PAYMENT TRANSACTIONS

(75) Inventor: Boris Mizhen, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 714 days.

(21) Appl. No.: 12/323,968

(22) Filed: Nov. 26, 2008

(65) Prior Publication Data

US 2009/0150262 A1    Jun. 11, 2009

Related U.S. Application Data

(60) Provisional application No. 60/992,623, filed on Dec. 5, 2007.

(51) Int. Cl.
G06Q 30/00 (2012.01)
G06Q 30/06 (2012.01)

(52) U.S. Cl.
CPC ................... G06Q 30/0641 (2013.01)
USPC .... 705/27.1; 705/26.1; 705/26.41; 705/26.81

(58) Field of Classification Search
CPC ................ G06Q 30/0613; G06Q 30/0641
USPC ............ 705/26, 27, 26.1, 26.41, 26.81, 27.1; 709/217
See application file for complete search history.

(56) References Cited

U.S. PATENT DOCUMENTS

| | | | |
|---|---|---|---|
| 6,119,101 A | 9/2000 | Peckover | |
| 6,331,858 B2 | 12/2001 | Fisher | |
| 6,594,692 B1 | 7/2003 | Reisman | |
| 6,636,863 B1 * | 10/2003 | Friesen | 707/999.102 |
| 6,980,962 B1 | 12/2005 | Arganbright et al. | |

(Continued)

FOREIGN PATENT DOCUMENTS

| | | |
|---|---|---|
| KR | 10-2000-0036568 | 7/2000 |
| KR | 10-2000-072125 | 12/2000 |
| KR | 10-2002-024356 | 3/2002 |
| WO | WO00/57332 | 9/2000 |

OTHER PUBLICATIONS

International Search Report & Written Opinion for Application No. PCT/US2008/084974, dated Jun. 25, 2009, 11 pages.

(Continued)

*Primary Examiner* — Ryan Zeender
*Assistant Examiner* — Hunter Wilder
(74) *Attorney, Agent, or Firm* — Johnson, Marcou & Isaacs, LLC

(57) ABSTRACT

A computer-implemented method includes accessing, with a user computing device, a web-based document from a first party containing a mark-up code segment pointing to a second party; and loading, using the mark-up code segment, a program for generating a shopping application for the web-based document. The loaded program is used to add to the web-based document event handlers associated with tags indicating items for sale, and a shopping cart containing information about an item for sale is generated upon triggering of one of the event handlers.

25 Claims, 12 Drawing Sheets

(56) References Cited

U.S. PATENT DOCUMENTS

| | | | |
|---|---|---|---|
| 7,175,079 | B1 | 2/2007 | Silverbrook et al. |
| 7,197,475 | B1 * | 3/2007 | Lorenzen et al. .......... 705/26.81 |
| 7,225,148 | B2 | 5/2007 | Kassan |
| 7,596,513 | B2 | 9/2009 | Fargo |
| 7,890,634 | B2 * | 2/2011 | Jiang et al. ................... 709/227 |
| 7,953,642 | B2 | 5/2011 | Dierks |
| 7,975,020 | B1 * | 7/2011 | Green et al. ................. 705/26.1 |
| 8,266,001 | B2 | 9/2012 | Dierks |
| 2001/0019332 | A1 | 9/2001 | Fisher |
| 2002/0006126 | A1 | 1/2002 | Johnson et al. |
| 2002/0007321 | A1 | 1/2002 | Burton |
| 2002/0049637 | A1 * | 4/2002 | Harman et al. ................. 705/26 |
| 2002/0055878 | A1 | 5/2002 | Burton et al. |
| 2003/0014319 | A1 * | 1/2003 | Arbab et al. ................... 705/26 |
| 2004/0051727 | A1 * | 3/2004 | Endo et al. .................... 345/700 |
| 2005/0097005 | A1 | 5/2005 | Fargo |
| 2006/0047582 | A1 | 3/2006 | Jiang |
| 2006/0173754 | A1 | 8/2006 | Burton et al. |
| 2006/0293926 | A1 | 12/2006 | Khury |
| 2007/0157077 | A1 | 7/2007 | Gibson et al. |
| 2008/0183593 | A1 | 7/2008 | Dierks |
| 2008/0307299 | A1 * | 12/2008 | Marchant et al. ............. 715/234 |
| 2009/0043674 | A1 * | 2/2009 | Minsky et al. .................. 705/27 |
| 2009/0077091 | A1 * | 3/2009 | Khen et al. ....................... 707/10 |
| 2009/0254450 | A1 * | 10/2009 | Bollay ............................ 705/26 |

OTHER PUBLICATIONS

'Developers.google.com' [online]. "Release Notes for Google Checkout XML API Developer's Guide," 2012, [retrieved on Aug. 6, 2012]. Retrieved from the Internet: URL<https://developers.google.com/checkout/developer/release_notes>. pp. 1-25.

European Search Report in European Application No. 08858848.8, dated Aug. 21, 2012, 4 pages.

Walmart—Site to Store web search, http://web.archive.org/web/20101112113000/http://www.walmart., pp. 1, Nov. 12, 2010.

Beal, Vangie, Google Checkout Open, Ready for Business, ECommerce Guide: http://ecommerce-guide.com/news/article.php/3617211/Google-, pp. 1, Jun. 28, 2006.

Chismar, T., The Home Depot Unveils New App Versions—iPhone 3.2 & Android 3.1, http://ext.homedepot.com/community/blog/the-home-depot-unveils-new-app-versions-iphone-3, pp. 1-3, Feb. 6, 2012.

Ryan, D., Home Depot Offers Buy Online, Pick Up or Return In-Store Service—Home Improvement Blog—The Apron by The Home Depot, http://ext.homedepot.com/community/blog/home-depot-now-offers-, pp. 1-14, Aug. 31, 2011.

* cited by examiner

FIG. 2D

ON-LINE PAYMENT TRANSACTIONS

CROSS-REFERENCE TO RELATED APPLICATIONS

This application claims priority from U.S. Provisional Application Ser. No. 60/992,623 filed Dec. 5, 2007, and entitled "On-line Payment Transactions," the contents of which are incorporated herein by reference.

TECHNICAL FIELD

This document discusses systems and methods for providing interaction with users of an on-line payment system.

BACKGROUND

Every year, sales at on-line retailers surpass the totals of the year before. Computer users have become more and more comfortable reviewing products on the internet and having them delivered by mail order. Often, such purchases are paid for using credit cards. Such an approach may be convenient, such as when buying a large item from an established retailer. Other transactions lend themselves more toward on-line payment processing systems (which themselves may be obtained through credit card companies or by other mechanisms). For example, person-to-person transactions may be paid for through open payment systems such as GOOGLE CHECKOUT or PAYPAL, such as when the person providing the product or service (the merchant or vendor) does not accept credit cards. Other types of purchases may also be carried out using such payment systems.

Small vendors such as individuals may have a need for such payment systems, such as when they cannot afford processing fees associated with other payment systems, cannot accept the risk of certain payment systems, or do not want to undertake complicated registration processes for other payment systems. For example, a seller of movie memorabilia may register with one of the on-line payment processing systems and may have others send them money for each sale. Such a user may also develop a web page that permits users to click on items to select, and that carries out an ordering and payment process for such users.

However, such an approach is often much less fulfilling for the user and the vendor than is a similar system offered by a major on-line store. For example, purchases from an integrated on-line store may appear to be part of a seamless process to the user, with a common user interface throughout the shopping and purchasing processes. In contrast, use of a general payment system (i.e., a system that is open to various vendors who register with the system, such as by providing an account identifier for the deposit of finds from making sales) may not be so smooth. For example, when a user selects an item, they may be directed away from the vendor's web page and to a web page associated with the payment system—a page that may be very different from the vendor's page, which will cause disruption to the user's actions, with a transition that looks less-than-professional. In addition, a vendor may have to spend extensive time coding a page with all sorts of special controls, and may even have to hire a programmer to develop the page in order to interact with such a payment system.

SUMMARY

This document describes systems and methods that may be employed to provide shoppers with mechanisms by which web sites showing items for sale can provide a rich shopping experience for users, without extensive programming work by the web site developers. In certain examples, instead of writing code for carrying out shopping actions on a page, a web page designer could simply provide certain tags in the HTML or similar code for a site, where the tags mark certain shopping-related page objects. As one example, a description of a good could be marked with particular tags, and a price for the good could be marked with other tags. (The developer could learn what tags to use from a publicly available list that follows a standard for marking up such web pages, or the developer may use a web page development environment that automatically inserts the tags.) The developer can also include a pointer to a piece of program code, such as a script tag to some JavaScript.

When the page is downloaded and processed by a potential shopper's browser, the pointer will cause the code to be loaded and run. The code may parse the page (e.g., by interacting with the page's DOM) to locate the particular tags, and may then replace or augment the tags with code to detect certain events in the shopper's interaction with the page. For example, the code may identify selections or clicks by the user on a "buy" button on a page. The program code may then act, or invoke other code to act, in response to the shopper's actions, such as by creating or updating a shopping cart in response to a user's selection of a "buy" button. The program code may cause certain state information, such as information about the contents of the shopping cart, to be stored. When a user selects a "checkout" button, the program code may cause the stored information to be transmitted to a server, such as the GOOGLE CHECKOUT system, that can process a transaction for the shopper, notify the merchant, and cause payment to be made from the shopper to the merchant.

Such techniques may, in certain implementations, provide one or more advantages. For example, they may permit a more seamless and professional shopping experience for shoppers by placing shopping cart information on or over the pages of vendors. Such an approach may look more like a familiar shopping process from an integrated retailer, than it does like a pieced-together system. Such an approach may also allow for seamless operation from relatively unsophisticated merchants (e.g., because the page can be constructed with mark up tags and no complicated program code), thereby enabling many more small companies and individuals to provide rich shopping experiences. In addition, the techniques benefit shoppers because the shoppers can be provided better options for buying goods and services, including through a single point of payment that increases simplicity and security.

In one implementation, a computer-implemented method is disclosed. The method includes accessing, with a user computing device, a web-based document from a first party containing a mark-up code segment pointing to a second party; loading, using the mark-up code segment, a program for generating a shopping application for the web-based document; using the loaded program to add to the web-based document event handlers associated with elements indicating items for sale; and generating a shopping cart containing information about an item for sale upon triggering of one of the event handlers. The method can further comprise parsing the web-based document to identify meta-data tags and adding the event handlers to those meta-data tags. The meta-data tags can comprise item microformat elements. Also, the meta-data tags can include custom tags that include content to be passed back to the first party.

In certain aspects, the methods further comprises receiving a checkout command and passing content from the shopping cart to a commerce server. The shopping cart content can be stored in a cookie on the user device, and can be encrypted to prevent interference by the user with the content. In addition, the shopping cart content can be passed to a open commerce API. In certain situations, adding the event handlers comprises editing the web-based document's DOM. Also, the web-based document can be authored using substantially only HTML.

In another implementation, a recordable media having recorded and stored thereon computer instructions is disclosed. The instructions perform the actions of parsing a web-based document to identify tags of items for sale, adding event handlers to the web-based document at locations associated with the tags, and generating a shopping cart for display to a user upon triggering of one or more of the event handlers. Generating a shopping cart can comprise creating an iframe containing shopping cart information in a common content area with the web-based document. The instructions may also perform actions of identifying a custom event tag and passing a labels associated to a commerce server upon an indication by a user to checkout. The custom event tag can comprise a merchant-specific transaction identifier, and the media can further comprise code that performs the action of retrieving a shopping cart generation program using a URL in the code.

In yet another implementation, a computer-implemented system is disclosed. The system comprises a web-browser to display a mark-up coded document to a user, a commerce application referenced in the mark-up coded document and adapted to parse commerce-related tags from the mark-up coded document and augment the mark-up coded document with event handlers that trigger upon user actions relating to the purchase of items referenced by the mark up coded document, and a file storing data reflecting items selected for purchase through the commerce application. The commerce application can be further adapted to generate a visual display of a shopping cart in response to triggering of the event handlers. Also, the system may further comprise an interface adapted transmit data corresponding to the file to a payment server for completing a transaction between a user viewing the mark up document and a merchant associated with the mark up document. The system can also be programmed to transmit to the payment server a merchant identifier and a user identifier. In addition, the system can also include a visual shopping cart generated in response to user interaction with a web page generated by the mark-up coded document, and adapted to display items selected by a user for purchase.

The details of one or more embodiments are set forth in the accompanying drawings and the description below. Other features, objects, and advantages will be apparent from the description and drawings, and from the claims.

DESCRIPTION OF DRAWINGS

FIGS. 2A-2D show example screen shots associated with the screen flow of FIG. 2.

Like reference symbols in the various drawings indicate like elements.

DETAILED DESCRIPTION

Figure 1:
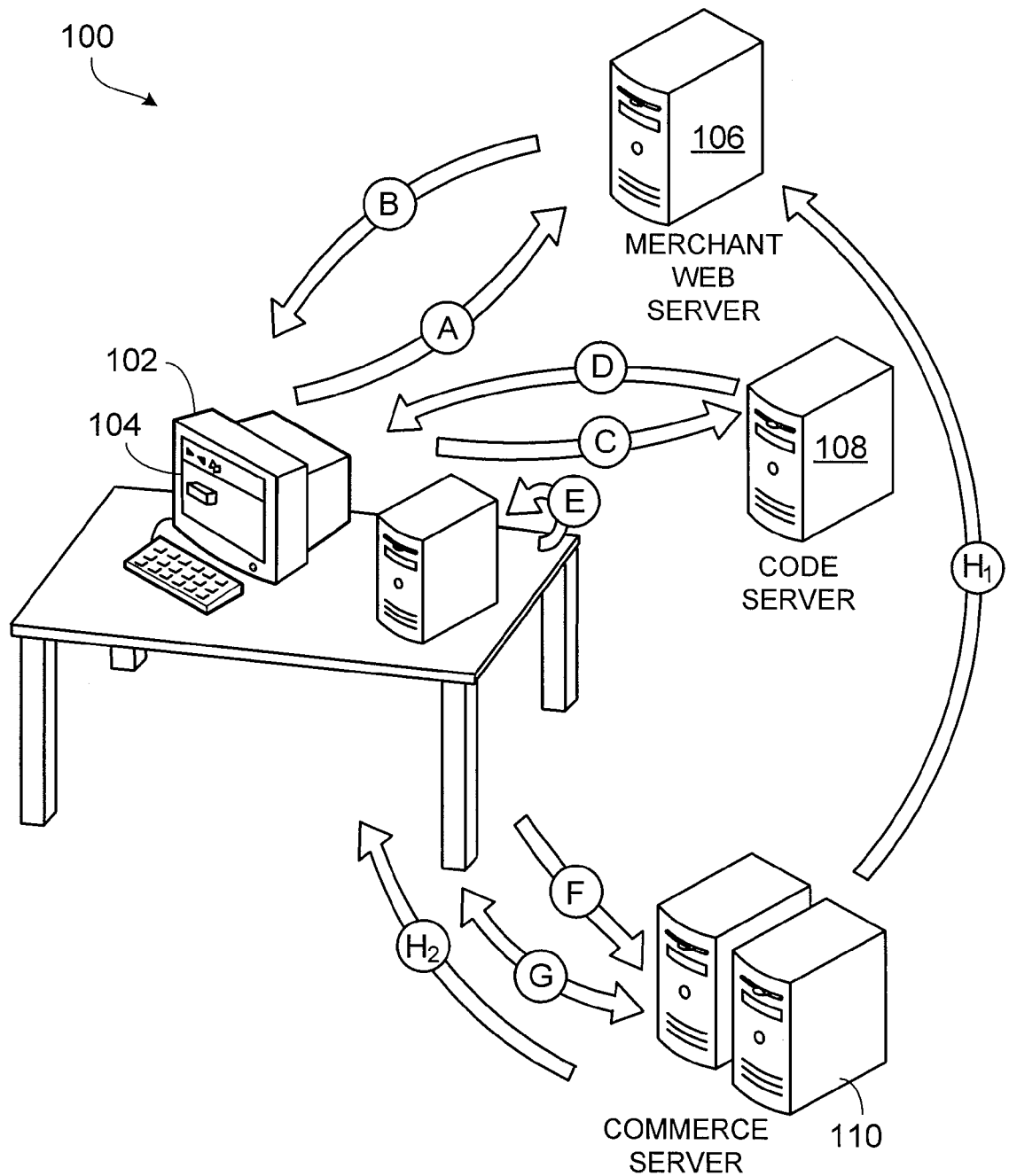
FIG. 1 shows a graphical conceptual flow diagram for identifying and purchasing items on a merchant web page.

FIG. 1 shows a graphical conceptual flow diagram for identifying and purchasing items on a merchant web page. In general, the figure shows a system 100 involving a client 102 operating a Web browser 104, and a number of servers 106-110 from which the client 102 obtains information over a network such as the Internet. The client 102 may initially download a web page that includes mark up code having tags that refer to parameters regarding an item that is being offered for sale by a merchant who constructed the page. The markup code may also have a script tag that, when the page is loaded, causes program code in the form of a script such as JavaScript to be downloaded. The program code may cause the web page to be parsed, such as by operating on the DOM tree of the web page, so that the particular tags in the markup code may be located.

Additional markup code may then be added to the web page by the program code so that when a user of client 102, such as a person shopping for items online, clicks on buttons on the web page or otherwise interacts with the web page, certain shopping functionality may be executed. For example, a shopping cart may be generated and shown over the top of the web page or in a window separate from the web page that shows items selected by the shopper. The items may be multiple items from multiple selections by the shopper. When the shopper is done selecting items, the shopping cart displayed may have a checkout option that, when selected by the shopper, directs the browser 104 to a checkout screen where the shopper may provide payment information and other similar information for receiving the goods that were purchased, and for paying for the goods.

As shown, client 102 is a standard desktop computer that may operate a Web browser. Client 102 may also take a variety of other forms such as a web-enabled cellular telephone, personal digital assistant (PDA), laptop computer, or other such device. In general, the browser 104 may operate on markup code such as HTML, WML, xHTML or other similar standard markup code. The markup code that is processed by browser 104 may include a variety of tags or HTML elements provided by an author of a web page, where the elements affect the manner in which a page is displayed, and that also may provide context for the display of the web page.

One such type of tag is a microformat tag that provides metadata, or contextual information, about elements on a web page. The particular microformat tag in this example is an "item" microformat tag that may be used to decorate HTML elements on a page that represent the price, description, quantity, and other such parameters for purchasing an item. The tags can be defined using mark-up code such as the following:

```
<body class="item"><div class="title">Hundred Dollar
Doughnut</div> <b class="price">$100.00</b></body>
```

This example identifies an item class having divisions or sections for a "title," which is the description of the product, and a "price," which is the price of the product in U.S. dollars. The definition of a div having a particular class attribute may be used to permit a program to find the tag in a DOM tree, among other things.

These particular item definitions may correspond to definitions published by a central information provider such as GOOGLE that supplies services in support of purchase transactions. In particular, the central information provider may publish a list of particular tags that may be used, and the manner in which they should be used. The web page developer in this example may have read such guidelines and thus added tags that correspond to the guidelines so as to make his or her page interoperate with a system from the provider.

A web page developer may also point to program code such as JavaScript code that is separate from the web page and can have been developed by a third party separate from the web developer (e.g., by the information provider). Such a pointer may take the form of a script tag, such as:

```
<script type="text/javascript" src=http://checkout.google.com
/file/cart-loader.js?mid=848813048561667></script>
```

In this example, the script tag points to code stored at a GOOGLE CHECKOUT server, and also passes a 15-digit parameter that represents the merchant's ID with the system. When such mark-up code is processed by a user's browser when rendering the merchant's web page, it will cause the particular file referenced in the script element to be retrieved and to be run on the user's computer.

Such code may be programmed to parse the DOM tree of the web page to identify item tags and/or elements placed by the web developer, like those discussed above. The program may replace the tags or elements, or may augment them to provide additional functionality for the page dynamically (i.e., each time the page is loaded, as opposed to being hard coded into the original page mark up code). For example, the program may insert event handlers that respond to certain user events, such as the event of a user clicking on an element or choosing an item from a menu, by performing certain actions, such as causing an item to be selected by a shopper.

The code may also generate a shopping cart, which is simply a object designated to track items selected by a user for purchase (and optionally to display the information or part of the information to a user), and information such as price and quantity of the items, before the user chooses to complete a purchase, such as by the user indicating an intent to check out (in a classic shopping cart paradigm). The cart may be presented to the user as a list of selected items in a pop-up window or by another similar mechanism associated with the web page, as described in examples below.

In addition, information about the items contained in the cart may be stored, such as in a cookie on the user's computer or by other appropriate mechanisms. Such stored information may include the quantity of each item ordered, the price of the items, descriptions of the items (e.g., for printing on an invoice or other transactional document) and particular parameters about the item (e.g., a size or color of a piece of selected clothing).

The mark up code associated with item microformats may take various forms depending on the particular circumstances. For example, custom attributes may be supported using a class marker of the form item-xxx in mark up tags, where xxx can be any legal class name (there is no actual "item-xxx" tag). A developer or another programmer may assign any valid name to the xxx entry, such as merchant-provided custom names. For example, a developer could define tags for "select" classes of "item-size," having possible values of small, medium, and large, to define parameters for the size of a piece of clothing. The particular item selected by the user may be passed to a payment server at checkout time, and may then be forwarded to the merchant so that the merchant can ship the appropriately sized item. Also, the particular class name provided by the merchant (or another party) may be passed to the merchant so that the merchant can reconcile the particular value received with that class. Such a feature may permit near unbounded custom extensions by merchants for use with the system 100.

Parameters for an item may also be joined together. For example, suppose a merchant wants to associate different prices with different sizes of clothing, but wants shoppers to be able to select a size with a radio button input mechanism and have the price automatically correlated to the selection (so that price is linked to size). Code in the following form may achieve such a goal:

```
<div class="title">
Microformat T-Shirt</div>   <b item-id="01" class="price"
>$100.00</b>
    <select class="item-size">
<option google-cart-set-price="$120" google-cart-set-item-id="02"
>medium</option>
<option google-cart-set-price="$120" google-cart-item-id=
"02">medium</option>
<option google-cart-set-price="$130" google-cart-item-
id="03">large</option>
    </select>
```

Example tags that could be included in an API for such a system may take the following exemplary forms:

| Tag | Description |
| --- | --- |
| item | Tag for an item container element |
| add | "add to cart" control, triggered by JavaScript "onClick" property |
| buy | Control to send an item directly to a commerce or payment server's buy or checkout page |
| shipping | Flat shipping charge per item |
| id | Merchant's item ID (optional, and provided for the merchant's reference) |
| price | Cost of the item |
| currency | USD, EUR, etc. (could be set automatically by detecting a currency symbol on the page, or by locating the country of origin of a web page or an IP address of a shopper) |
| title | Item name, which shows up in the cart, and is passed to a payment or commerce server |
| count | Item quantity (multiplied by price to get total cost of item) |
| img | url of an image to display in the cart |
| item-url | url to link back to an item details page or takes the current page's url |
| gift-message | gift message, passed to merchant |
| gift-receipt | Any value of a gift receipt |
| delivery-instruction | Special delivery instructions (e.g., fragile, air mail, etc.) |
| xxx | This is a placeholder for any particular class name a merchant wishes to add to a page. |
| widget | Allows page developer to provide a location for the shopping cart widget |

The HTML mark up code for a simple but fully functional store that sells a single product (a hundred dollar donut), and that corresponds to the code listed above, may take the following form:

```
<html>
    <head>
    <title>A Cool Store</title>
    <script type="text/javascript"
```

```
        src="http://checkout.google.com/file/cart-
        loader.js?mid=848813048561667"></script>
        </head>
        <body class="item">
        <div class="title">Hundred Dollar Doughnut</div>
        <b class="price">$100.00</b>
        </body>
    </html>
```

Lettered arrows in FIG. 1 show an exemplary flow of information during a shopping session by a user of client device 102. In an initial operation, shown by Arrow A, the client device 102 requests a web page from merchant web server 106. The request may occur, for example, after a user clicks a link directed to the web page, in an ordinary manner for web navigation.

Arrow B shows the merchant web server 106 transmitting HTML markup code representing the web page back to client device 102, where it is displayed as web page 104. As part of displaying the page, client device 102 may analyze markup code in the page, including code that includes script tags or other similar elements. Such elements may result, for example, in the client device 102 sending a request to code server 108, as shown by Arrow C. The code server 108 may store scripting program code or other similar code associated with a page markup approach that was followed by the author of the web page 104.

Arrow D shows the transmission of the code to client device 102, where it may be executed. As shown by Arrow E, the executing code may perform a number of functions internal to client device 102. For example, as discussed above and below, the code may parse the web page 104 document, such as through the DOM tree for the document, and may identify item elements or tags or other similar elements that provide context for a shopping application on the web page 104.

The program code may then replace or augment those elements with more active elements that may track operations that occur on the page 104. For example, the added elements may include event handlers that respond to particular commands or actions by a user reviewing client device 102. The added code may reflect particular content in the original markup code provided by merchant web server 106. For example, in parsing the web page 104, the program code may look for particular arguments or parameters in the markup code to determine the sort or form of event handlers to be inserted on the web page 104.

Other internal actions that may be handled by the program code or by additional program code loaded onto client device 102 may include handling of interactions between the user and the web page 104. For example, the user may trigger certain events associated with the event handlers that have been added to the web page 104. In the context of a shopping application, such events may include selecting parameters associated with an item such as a quantity, a color, a size, options for an item, or other parameters. Another common event may be the selection of an "add to cart" button, which may cause the program code to generate and display an area (e.g., in an iframe) for a web shopping cart, with the item that is associated with the "add to cart" button shown in the shopping cart. The shopping cart may take a variety of forms, such as a pop-up window that includes a list of items that have been added to the shopping cart, a total price for the selected items, and a control that the user may select to proceed to a checkout.

Arrow F shows a communication after a user has chosen to proceed to a checkout, e.g., after the user has selected all items he or she wants to buy. Such a selection may cause data associated with the shopping cart to be passed to commerce server 110. Commerce server 110 may include server systems such as the GOOGLE CHECKOUT system that is available to the public. The information passed to commerce server 110 may include information necessary to complete a transaction between the user and a merchant associated with merchant web server 106. Such information may include, for example, information needed to credit and debit financial accounts for the transaction, and also information needed for the parties to carry out and track the transaction. Such information may include shipping information for the user, to be provided to the merchant, descriptions of the item to be purchased, such that the merchant may fulfill the order with a properly selected and provisioned item, the price of the item, and other appropriate information.

The checkout process may occur in various manners, with communication back and forth between client device 102 and commerce server 110, as shown by Arrow G. For example, if the user has previously enrolled with a service associated with commerce server 110, such as by providing name, address, credit card number, and other similar information, and the user has logged into that service in the current session, the user's information they be automatically added to a checkout page, and the user may complete a transaction simply by clicking to confirm the provided information. Alternatively, the user may be asked to provide such information in a common manner and may confirm that the in provided information is accurate. Such communications may occur independently of the merchant web server 106 in a variety of secure manners that ensure that the user's financial data is not accessible by any party other than the party operating commerce server 110.

Once the transaction is completed by the user, confirmation of the transaction may be sent to the client device 102 and the merchant web server 106, or another server associated with the merchant who generated web page 104, as indicated by Arrows $H_1$ and $H_2$. For example, an e-mail confirmation may be sent to the client device 102 that includes standard information regarding the transaction, such as a price that indicates an amount of money that has been billed to the user, such as through an online payment system or credit card, and also a transaction number by which the user may later refer to the transaction if there are problems or questions.

The information provided to the merchant web server 106 may include information that is needed for the merchant to deliver the ordered item to the user. For example, the information may include a shipping address, a description of the item, a quantity of items ordered, and particular parameters about the item, such as size and color. In addition, in certain circumstances where information stored on client device 102 may be compromised by a user, such as by changing pricing information on a web page (e.g., by accessing and modifying data in a cookie), the information provided to merchant web server 106 may notify the merchant that the particular transaction was open to tampering by the user. As a result, the merchant may be put on notice to check the price for the transaction before shipping any items, in case the user surreptitiously lowered the price for any items that were selected.

Using techniques such as those just described, the system 100 may permit a merchant associated with merchant web server 106 to create an online store very simply without needing extensive programming knowledge. For example, in certain implementations, the user may only need basic knowledge about HTML coding, or an application that generates HTML code automatically. In such an example, the user may provide drop-down boxes for selecting options for an item, may designate prices for an item, and may include images and other information related with an item very easily. In addition, the user may define other metadata associated with the item for a transaction, and the user may cause certain of such information to be returned to the merchant by a service such as a service running commerce server 110.

By these mechanisms, a small merchant can be given an opportunity to develop very interactive and richly operating stores online that may approach or exceed the quality of stores provided by more established merchants with teams of programmers. As a result, makers of small goods such as arts and crafts, may be given an opportunity to expand the markets for their goods and to more easily market such goods throughout the world. The operator of commerce server 110, who in many examples may be the same as the operator of code server 108, may in turn be able to increase the volume of transactions it covers and open itself up to a whole new class of merchants who are not sophisticated programmers.

In some cases, instead of parsing an entire webpage at the outset, portions of a webpage may be parsed after an event of interest occurs. For example, an event handler that handles the events associated with a webpage may be added to the webpage 104. When an event of interest occurs (e.g., a user clicks on a checkout button), a portion of the webpage 104 (e.g., a product container) specified by the event may be parsed as described above in response to the occurrence of the event, and the event handler may process the event.

Figure 2:
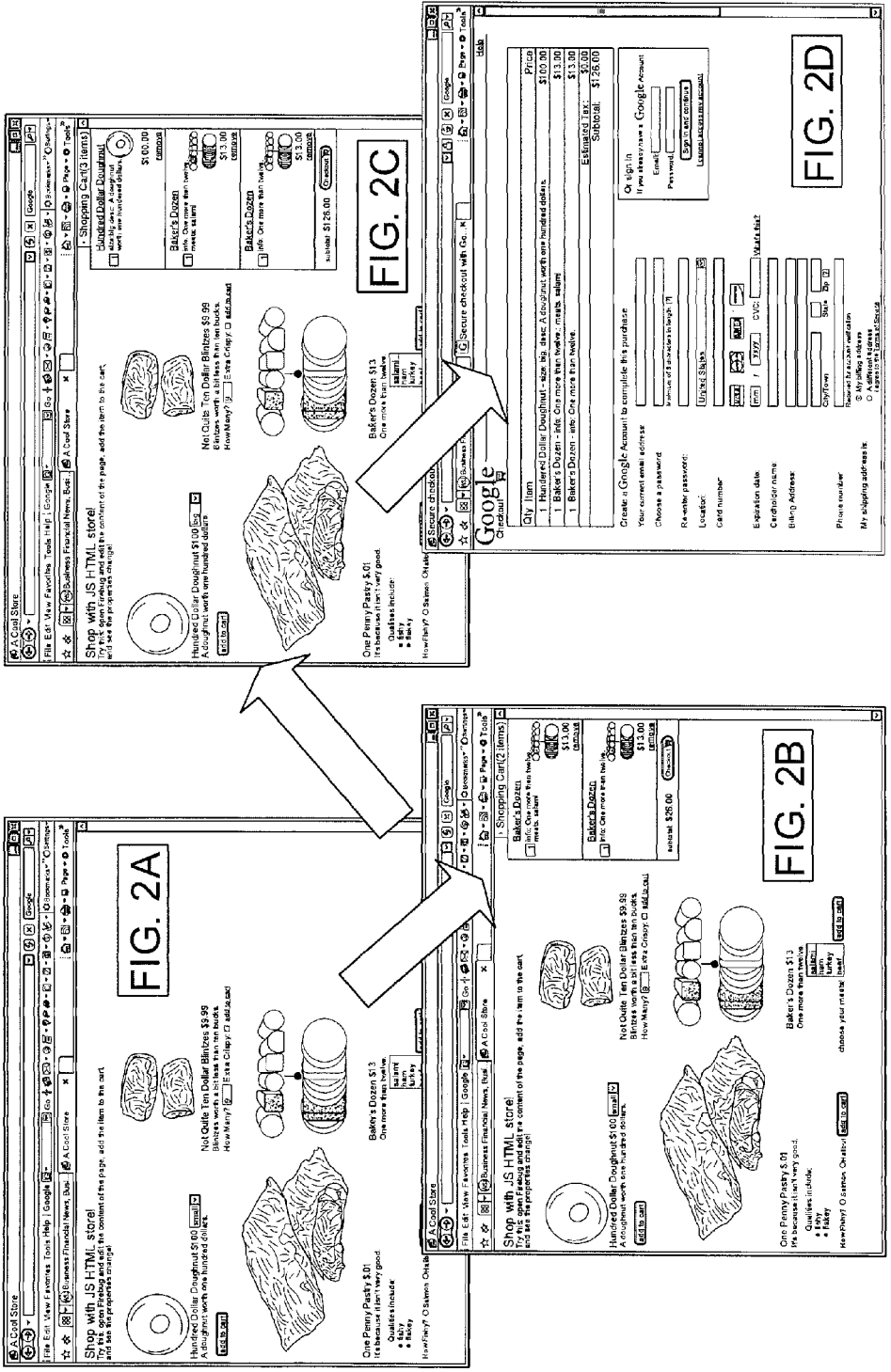
FIG. 2 shows a graphical screen flow that could be seen by a shopper interacting with a merchant web site.
Figure 2A:
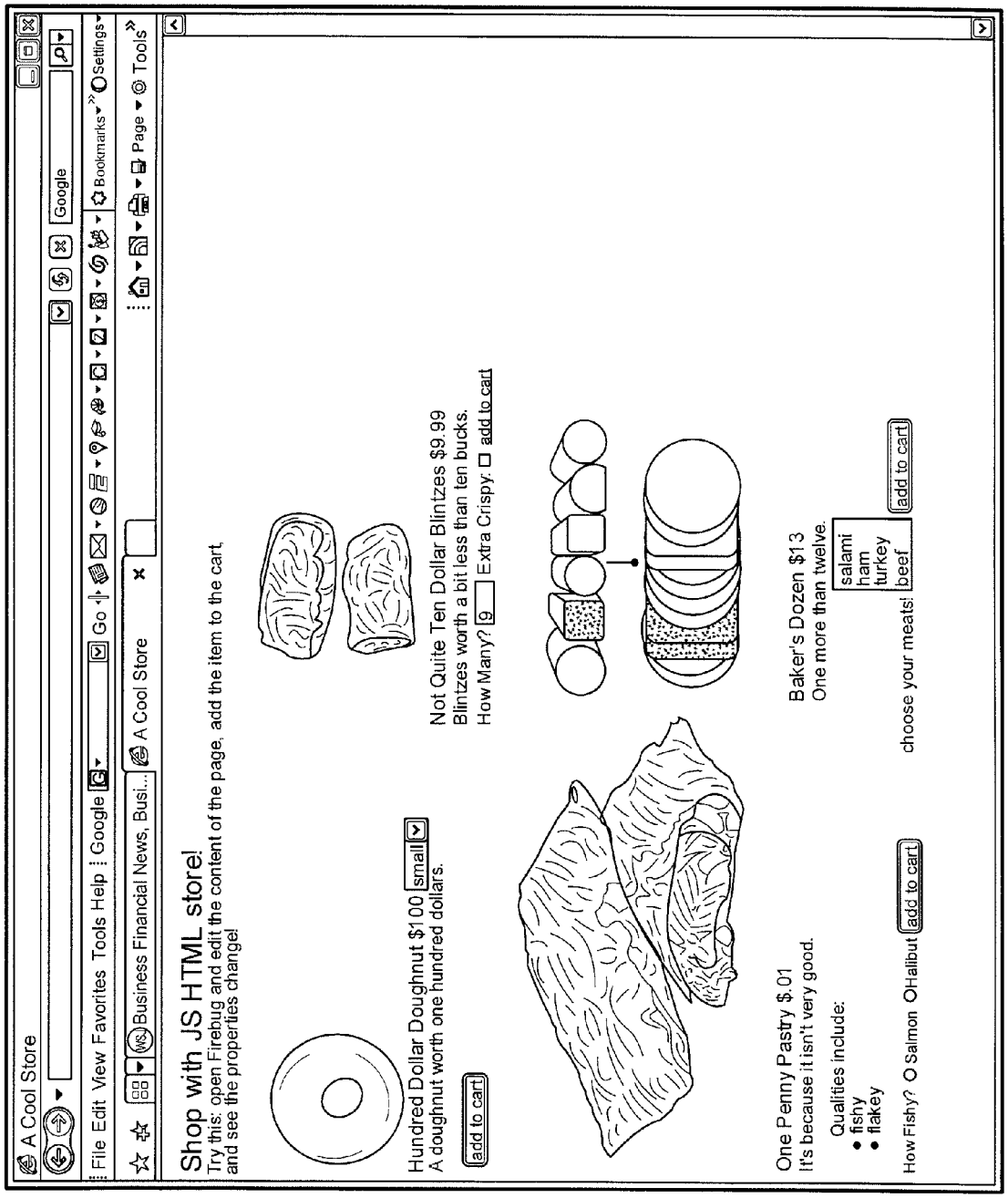
Figure 2B:
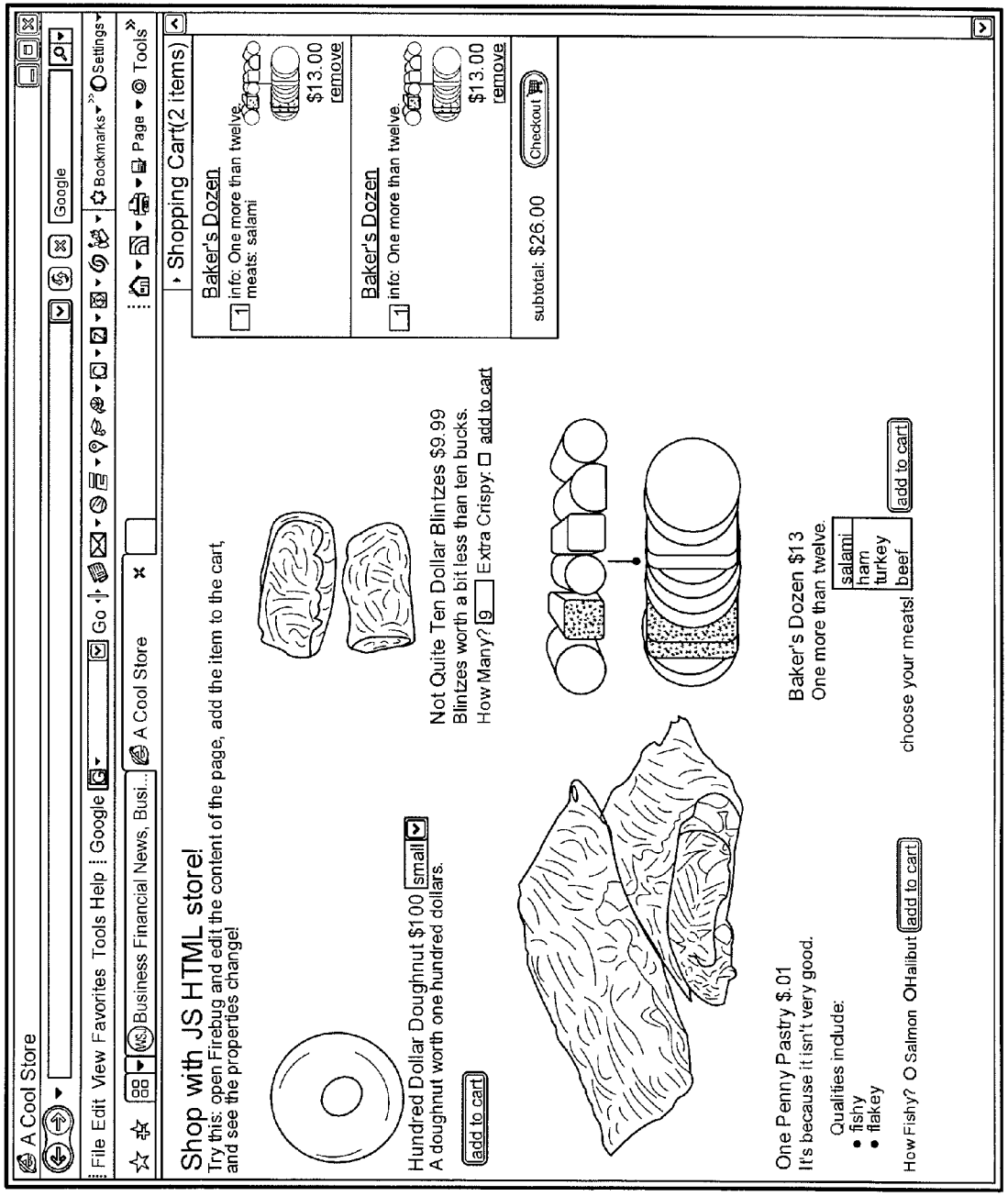
Figure 2C:
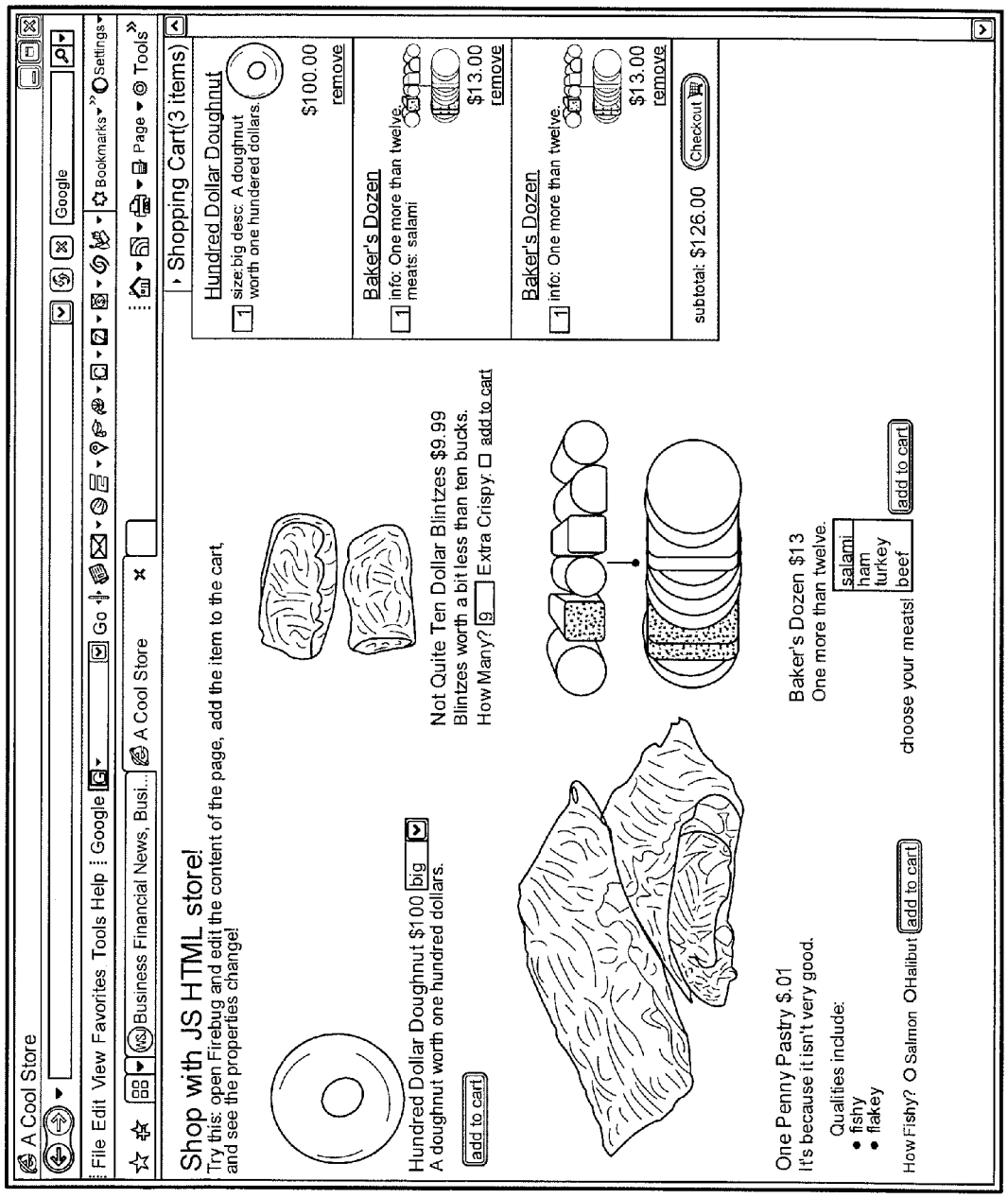
Figure 2D:
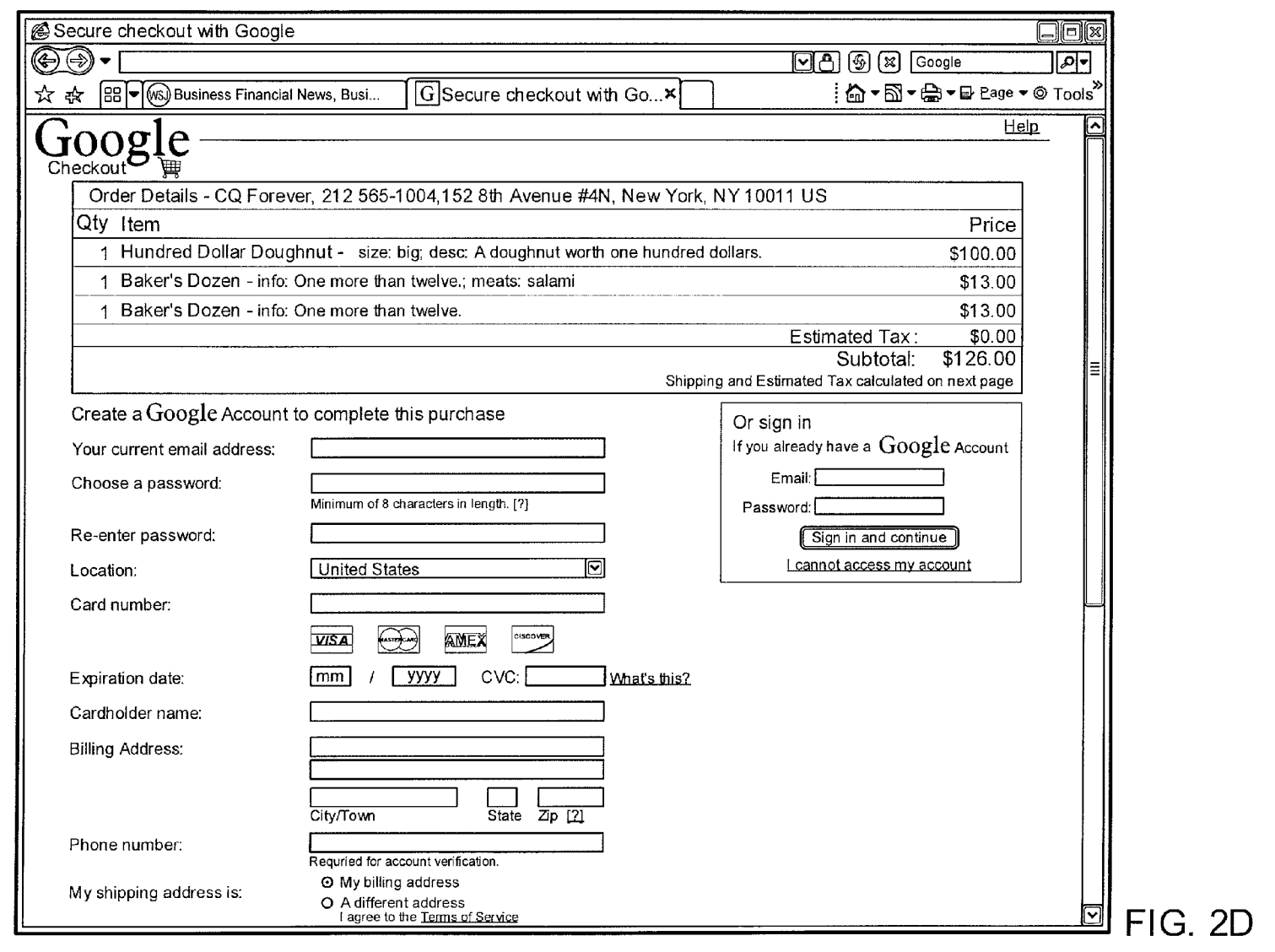

FIG. 2 shows a graphical screen flow that could be seen by a shopper interacting with a merchant web site. FIGS. 2A-2D show example screen shots associated with the screen flow of FIG. 2. In general, the different figures show what a shopper would see at a fictional online deli known as the J S HTML store. FIG. 2A shows an initial display of products for a shopper before the shopper has selected anything. FIG. 2B shows the display after the shopper has selected two different forms of the bakers dozen meat option. FIG. 2C shows the display after the shopper has also selected $100 donut. FIG. 2D shows the display after the shopper has chosen to check out. We next refer to each figure in more detail.

Of particular interest, the various components of an on-line payment system are visually integrated in these figures with the merchant's own web site so that a shopper can see the progress of their shopping as they go along, much as they would in an integrated purchasing environment, where the merchant itself takes care of payment processing. At the same time, the payment may occur through a third party, which may be more trusted than is the merchant, so as to make the process even more enticing for small merchants and for shoppers.

By this example process, the system may also, in appropriate circumstances, be able to avoid taking a purchaser on a "round trip" to the payment processor's web page and back to the merchant's page, or opening another window or tab in a browser during the purchasing process. In general, such a new window would likely have a different interface than does the web site of the merchant, and could thus be confusing to the shopper, or at least take away from the immersive aspect of the shopping transaction that is more readily available when one company handles both the merchandise and payment processing.

With respect to FIG. 2A, an initially configured home page for a food store is shown. The page shows four different items that can be purchased: a hundred dollar donut, a not quite ten dollar blintze, a one penny pastry, and a baker's dozen collection of meats. The doughnut area has a size selector, in the form of a pull down menu, that permits a shopper to choose a small, medium, or large doughnut. The blintze area has a text entry box that permits a shopper to enter a number of blintzes they would like to buy (at $9.99 each) and a check box to indicate whether they want the blintzes to be extra crispy. The pastry area has radio buttons that the user may select to indicate whether they want their pastry to include salmon or halibut. And the meat area includes a selection object by which the shopper may select to receive one of four different meats. Each area also has an associated "add to cart" link or button whose selection causes the appropriate item to be added to a shopping cart for the user, so that the user may select multiple different items before completing a transaction to purchase all of the items.

The HTML code for this example page takes the form of:

```
<!-- DOCTYPE HTML PUBLIC "-//W3C//DTD HTML 4.01//EN" -->
<html>
<head>
<title>A Cool Store</title>
<script id="cbg-script" type="text/javascript" src="cart-
v1.js?mid=848813048561667"></script>
<link media="screen" href="widget.css" type="text/css"
rel="stylesheet">
<style type="text/css">
// CSS for my store can take advantage of HTML store classes
.cbg-price{font-weight:bold;}
.title{font-family:sans-serif;font-size:larger;}
.button{color: #CCCCCC; background-color: #222266; padding: 3;
  font-size:larger;}
</style>
</head>
<body>
<h1>Shop with JS HTML store!</h1>
<h3>Try this: open Firebug and edit the content of the page,
add the item to the cart, and see the properties change!</h3>
<!-- div class="cbg-widget"></div -->
<table>
<tr><td class="item">
     <img class="image" src="doughnut.jpg"/><br/>
     <span class="title">Hundred Dollar Doughnut</span>
     <span class="price">$100</span>
      <select class="item-size">
   <option>small</option>
   <option>big</option>
    </select><br/>
<div class="item-desc">A doughnut worth one hundred
dollars.</div>
<input type="button" class="google-cart-add" value="add to cart"/>
</td><td class="item">
   <img class="image" src="blintz.jpg"/><br/>
   <span class="title">Not Quite Ten Dollar Blintzes</span>
   <span class="price">$9.99</span>
<div class="item-info">Blintzes worth a bit less than ten
bucks.</div>
   How Many? <input type="text"
          class="google-cart-quantity" value="9" size="2"/>
Extra Crispy: <input type="checkbox" class="item-burnt"
value="yes"/>
   <a href="" class="google-cart-add">add to cart</span>
</td></tr>
<tr><td class="item">
   <input type="image" class="image" src="salmon.jpg"/><br/>
   <span class="title">One Penny Pastry</span>
   <span class="price">$.01</span>
   <div class="item-desc">It's because it isn't very good.</div>
   <ul>Qualities include:<li class="item-inside">fishy</li>
   <li class="item-outside">flakey</li></ul>
   How Fishy?
   <input type="radio" name="fish"
     class="item-fish" value="salmon"/>Salmon
   <input type="radio" name="fish"
     class="item-fish" value="halibut"/>Halibut
   <button class="google-cart-add">add to cart</button>
</td><td class="item">
     <img class="image" src="mix.jpg"/><br/>
   <span class="title">Baker's Dozen</span>
   <span class="price">$13</span>
   <div class="item-info">One more than twelve.</div>
choose your meats!
<select class="item-meats" multiple>
```

```
        <option>salami</option>
        <option>ham</option>
<option>turkey</option>
            <option>beef</option>
            </select>
            <span class="google-cart-add button">add to cart</span>
</td></tr></table>
</body>
</html>
```

FIG. 2B shows the same screen, but after a shopper has twice selected the "add to cart" control for the meat area. In response to such a selection, the program code has instantiated a pop up window, such as in the form of an iframe, to show the contents of a shopping cart for the shopper.

As can be seen by an exemplary shopping cart in the upper right corner of the browser window, the first selection did not involve a selection of any of the particular meats (and thus could result in delivery of a grab bag of meats, or perhaps should have resulted in an error message being generated for the shopper). Before the second selection of the "add to cart" control, however, the shopper selected salami (as is still shown in the selection box). The shopping cart display shows both such selections, with the particular relevant detail for each selection, and also includes basic functionality that sums the amounts for each selected item and allows a user to remove items from the cart.

In this example, the shopping cart was able to capture the dynamic behavior of the shopper's selection of "salami" by not capturing the full content of the page until the "add to cart" selection was made. In particular, the initial page was merely parsed to identify locations for adding event handlers to the page. The "add to cart" event handler then pointed to program code to check HTML elements (here, the selection associated with the select class="item meats") in capturing data to provide to the shopping cart builder. In other words, the data in the marked elements is read after a buy event is fired, so that any post-loading dynamic page manipulation that occurs in response to user interaction can be accounted for.

The iframe may also persist in the display area of the vendor's page and disappear after a period of time (but remain persistent), and reappear later, such as only after it has been updated with new information. Such an action may prevent a user from seeing changes taking place in the window when they are made, so as to make the operation appear more seamless to the user.

FIG. 2C shows the same display after the user has additionally selected a doughnut. Note that the user also selected size "big" from the pull down menu before pressing the "add to cart" button control. As can be seen, the doughnut has been added to the cart, along with the "big" parameter, and the total cost of this shopping trip has increased to $126.00.

Though not shown in this example, the program code for creating and maintaining the shopping cart may check, before adding an item to a cart, whether that item has previously been added to the cart. If it has, the code may determine to add one to the quantity displayed for the item, but not to add another line item entry to the cart. Other similar functionality may be implemented using such techniques.

FIG. 2D shows the display after the shopper in this example has selected the "checkout" button on the shopping cart display area. Such a selection may cause the code that manages the shopping cart to gather information associated with the cart, such as plain text or encrypted information in a cookie, and pass that information to a central service provider such as the GOOGLE CHECKOUT service of GOOGLE. Such passing of information may occur according to a standard API for the service. As can be seen, the information passed to the service includes essentially the information displayed in the shopping cart display, such as quantities of each item ordered, the total price of each item, a description of each item (along with particular parameters selected by the shopper), and a name and address of the merchant (e.g., "CQ Forever" in this example). The passed information may also include an ID for the shopper that is registered with the payment service.

The remaining information shown may be a standard screen for entering billing and shipping information—here a screen from GOOGLE CHECKOUT. A sign in box is also provided. If the shopper signs in (or if the shopper had been previously signed in during a session), the billing and shipping information could have been added automatically to the form and could then be edited by the shopper as necessary. Also, the shopper may be allowed to delete items from a list or change the quantities of such items on this page, in certain implementations.

At this point, the interaction with the shopper may occur according to conventional mechanisms to permit closing out of the transaction. In particular, a payment server or commerce server may prepare the order for immediate payment and closing once the identity of the shopper and other relevant information is known. For example, the payment server may compute parameters such as tax and shipping/handling. To do the former, the payment server may analyze information about the purchaser and about the vendor (e.g., whether the two are in the same state or not, or whether the purchaser's shipping address is in a state having an applicable sales tax). For the latter, the payment server may obtain information from the vendor about costs for shipping and handling; in certain implementations, the merchant (e.g., via information receive from the client 102, or by provision of a merchant ID number) may point the payment server to a standard shipping table such as that maintained by public shipping companies like UPS or Federal Express.

When the shopper chooses to complete the purchase, their account is debited by the payment server in an amount equal to the price of all the goods in the shopping cart plus tax, shipping/handling, and other costs, such as a transaction charge for the payment processor. In a like manner, an account for the merchant may be credited, and the creditor may be notified of the transaction, with shipping information for the purchaser. Such changing of account balances may occur, as in this example, by submitting information about the merchant and/or the shopper to a credit card company or other similar company using a standard API. In one example, the credit card company credits an account associated with the payment server, and the organization operating the payment server may in turn credit an account associated with the merchant.

The merchant may have previously selected a preferred method for being informed of transactions, such as by e-mail for a small merchant and via XML messaging or updating of a database that is accessible to the merchant (e.g., as stored in GOOGLE BASE). In addition, the merchant and shopper, in registering with the system, may have agreed to be contractually bound to make agreed-upon payments and/or deliveries of goods, so as to help ensure that transactions will be carried out successfully. The merchant may receive information such as the identity and quantity of goods sold, the amount of the transaction, and a shipping address for the shopper so that the merchant can ship the goods. Also, the information sent to the merchant may alert the merchant if there is a possibility that the shopper could have altered the order data (e.g., so as to have lowered a price improperly), so that the merchant will know to check the reported price against its own databases.

Figure 3:
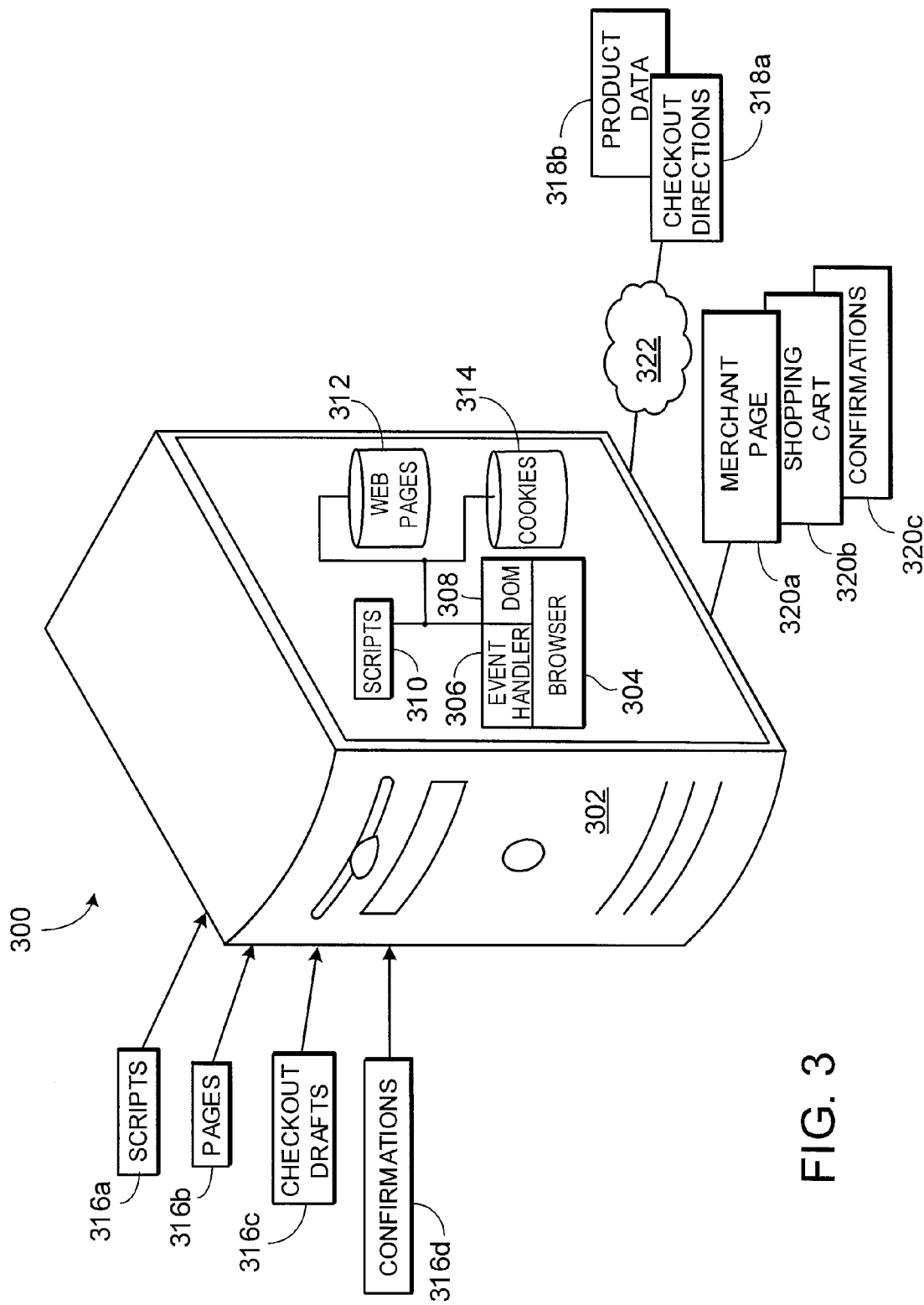
FIG. 3 shows a block diagram of an example payment processing system.

FIG. 3 shows a block diagram of an example payment processing system. In general, the system 300 centers around a computing client 302 that has been provided with appropriate markup and program code to display and operate a merchant site for a shopper operating the client 302.

The client 302 receives a number of various program inputs, and generates a number of outputs. As examples of inputs received by the client 302, web pages 316b may be retrieved by a web browser 304 operating on the client 302 in a familiar manner. In addition, where web pages that are retrieved include references to scripts or other references to program code, the client 302 may retrieve scripts 316a or other appropriate program code for operating in conjunction with web pages 316b. In addition, when a shopper using client 302 has completed a transaction, client 302 may receive web pages from a payment server or other similar server showing draft views of a checkout screen 316c. Such views may include displays such as the display shown in FIG. 2D. In addition, upon completion of a payment transaction, client 302 may receive confirmation messages 316d from the payment server, such as in the form of a confirmation web page, confirmation text message, XML data, or confirmation e-mail.

Client 302 may operate upon the inputs using a number of various components. In particular, client 302 may operate a standard web browser 304, which may be equipped to produce and interact with a number of different objects. For example, a document object model, or DOM, may be managed by the browser and be accessible for reading and editing by various applications running in association with the browser, such as applications running in JavaScript and other similar languages. The program code, shown here in the form of scripts 310, may be loaded when the browser 304 displays the web page, and may interact with the browser or mark up code displayed with the browser in various manners, as discussed above and below.

For example, scripts 310 may analyze the DOM 308, for particular item microformat tags, and may create event handlers 306 associated with those microformat tags. The event handlers 306 may interact with other mark up code in a web page displayed by browser 304, and with scripts 310, such as to produce a shopping cart in an iframe or other appropriate mechanism in response to selections by user of items on the web page.

A variety of items may also be stored on client 302 to enable operation of the other systems. For example, web pages storage 312 may include memory for storing a web page that is currently being displayed by browser 304, or other web pages, and may permit for dynamic modification of the web pages, such as when a user selects parameters for an item to be purchased on a web page. Cookies storage 314 may take various forms, such as a directory holding multiple cookie text files. With respect to the systems discussed here, a particular cookie may be created that includes data associated with a shopping transaction, such as data identifying numbers for an item, descriptions of the item, quantities ordered, and prices of the item, among other things. The information may be stored in various forms, such as in plain text, or in hashed forms to prevent modification by a user of client 302.

Client 302 may also provide a number of different outputs in response to user interactions and reception of web pages. For example, client 302 may communicate over a network 322, such as the Internet, to provide information such as product data 318b to a payment server, and also checkout directions 318a to the server. The product data 318b may include information pulled from cookies database 314, or similar information that reflects the data in cookies database 314. A checkout directions communication may include information about payment methods to be made for a transaction, shipping information for a shopper, and other similar information. In addition, the client 302 may provide a number of other communications across network 322, such as requests for web pages and for information relating to the web pages.

Client 302 may also provide a number of outputs to be displayed to a user of client 302. For example, a merchant page 320a may be displayed to the user, and the user may interact with the page by selecting items for purchase. Also a shopping cart 320b may be displayed, such as in an iframe, and be shown to a shopper so that they can see the current status of a shopping session before choosing to checkout. Also, confirmations 320c may be displayed to the shopper, such as to inform the shopper that a payment transaction has been completed and to provide the terms for the transaction so that the shopper may quickly audit the transaction to make sure that it is accurate.

Figure 4A:
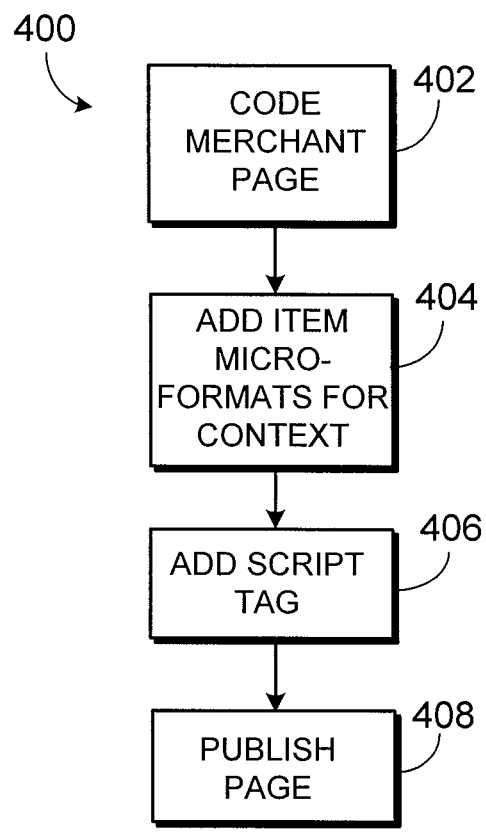
FIG. 4A is a flow chart of a process for establishing a merchant web page.

FIG. 4A is a flow chart of a process 400 for establishing a merchant web page. Because of the techniques described above and below, the process is fairly simple. At box 402, the merchant page is coded, such as by a merchant themselves operating a standard web page development environment that is capable of generating HTML or other mark up code in response to graphical and other elements placed on a page layout by the merchant. At box 404, item microformats are added to the mark up code for the merchant page. Such codes maybe be added automatically by the development environment, such as by recognizing the selection by the merchant of particular elements for inclusion in a page. As one example, the development environment may provide a number of graphical elements that the merchant may drag onto a page, and when those graphical elements include shopping-related features, the underlying mark up code for the elements may include appropriate item microformats.

At box 406, a script tag is added. The tag may be typed manually by the merchant, or may be added automatically by a programming environment, such as in response to an indication by the merchant that they want their web page to be interactive in a shopping environment like those discussed above and below. At box 408, the merchant publishes the page. Such publication may occur according to familiar techniques, such as by selecting a publish button in a programming environment.

Figure 4B:
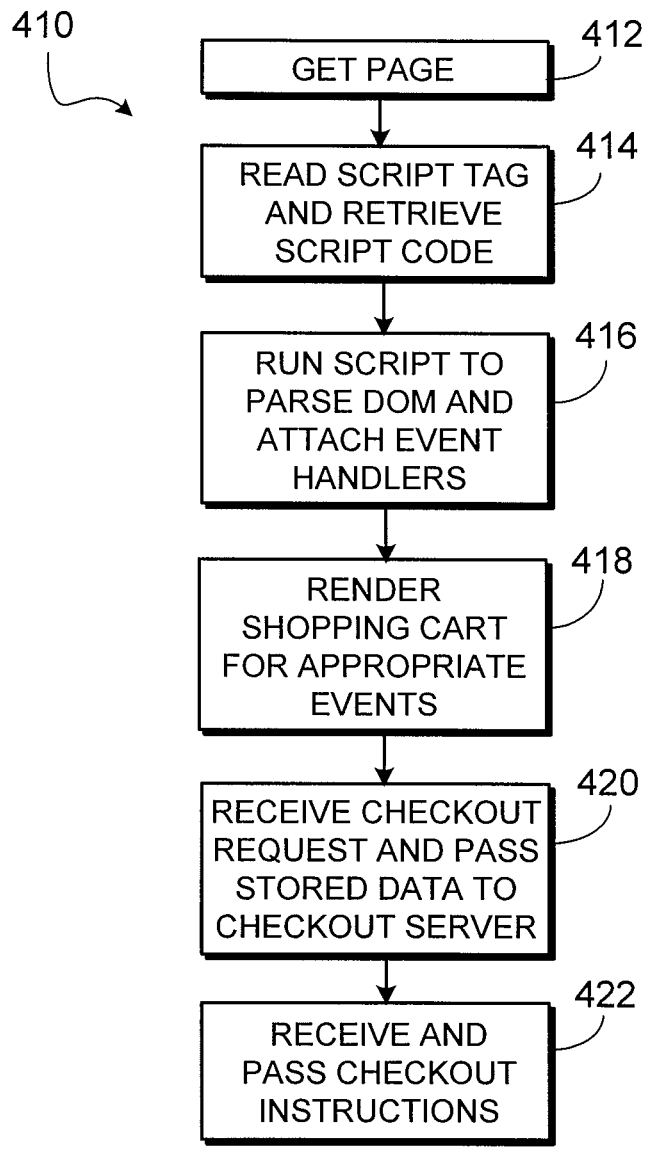
FIGS. 4B and 4C are flow charts of processes for presenting a shopping experience with a merchant web page.
Figure 4C:
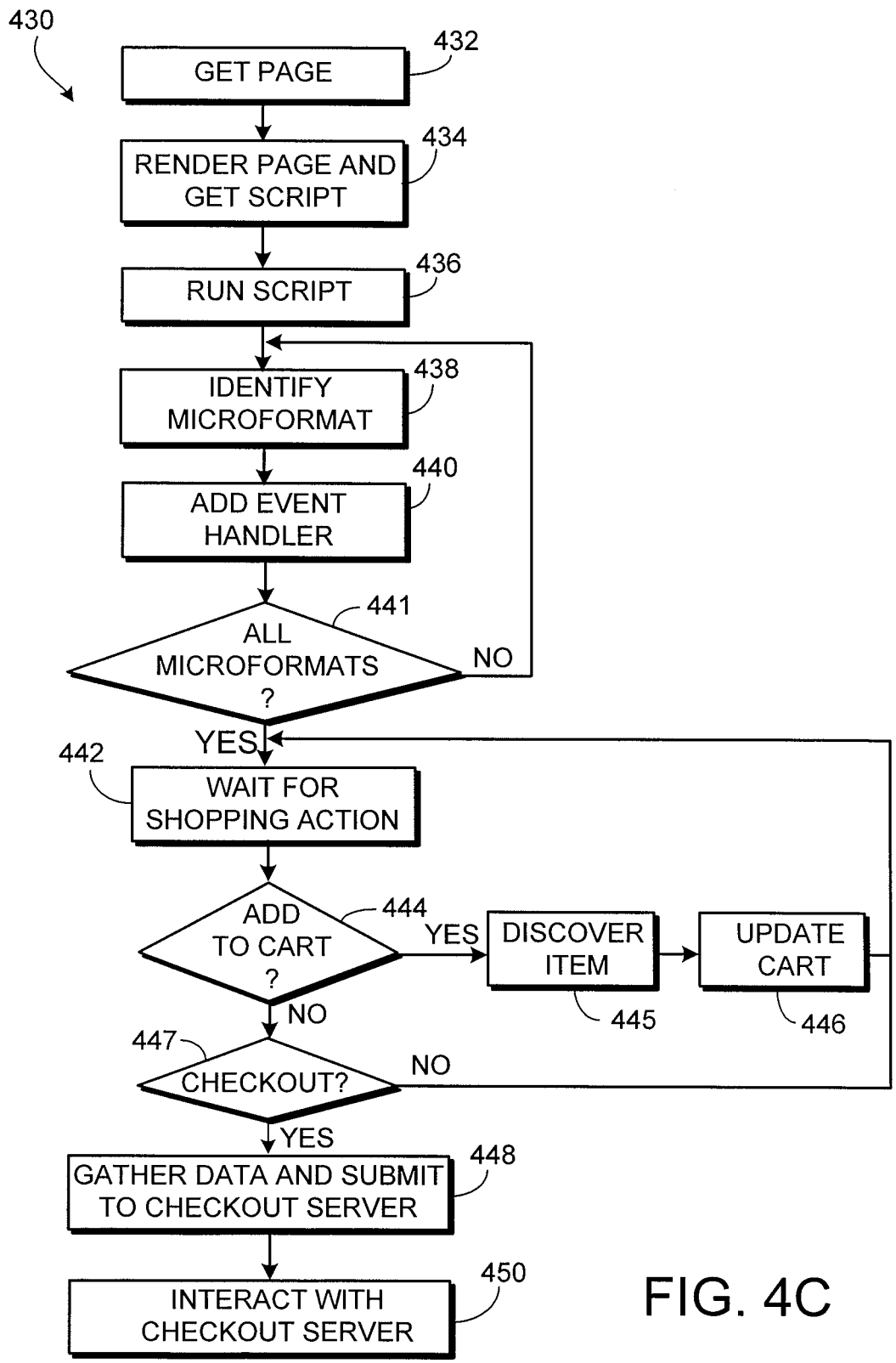

FIGS. 4B and 4C are flow charts of processes 410, 430 for presenting a shopping experience with a merchant web page. In general, the flowcharts show actions that may be taken by a computer, such as a personal or laptop computer or a personal digital assistant or smart phone, and in some circumstances one or more servers, to obtain a merchant web page and interoperate with the web page in a manner that permits shopping on the web page. The web page may be a page, for example, that was created in accordance with the process shown in FIG. 4A.

At box 412, the computer gets the web page. Such activity may occur in response to a user typing a URL into an address field of a web browser, or by a user selecting a hyperlink from another web page. A box 414, the computer begins to interpret and display the web page, and parses a script tag from the page, operating upon the tag by retrieving program code corresponding to the script tag. At box 416, the computer has retrieved the script code and begins to run it. In this example, the script program code includes instructions to parse the DOM tree for the web page so as to identify item microformat tags that provide context for other entities on the page, and to attach event handlers of various forms at the locations identified by the item microformat tags.

At box 418, a user of the computer has interacted with the web page displayed on the computer, such as by selecting an item to add to a shopping cart. Such selection may trigger one of the previously populated event handlers, which may pass information to the program code reporting on the actions of the user of the computer. The program code may then cause an iframe to be instantiated, and to be populated with content displaying a shopping cart, like the shopping cart shown in FIG. 2B. Various other interactions may occur with the web page, causing event handlers to report additional information to the program code, and causing the program code to update the content and display of the shopping cart. Each of these interactions may also cause data to be written to a cookie associated with the program code, where the data may later be used to report the content and status of the shopping cart to a remote payment server.

After a user has finished selecting and configuring items for purchase from the web page, they may select a control such as a checkout button, and the computer may pass data such as the data stored in the cookie or data corresponding to such stored data, to a checkout server, as shown at box 420. The data may be formatted in an appropriate manner, such as according to an API, and may be passed in familiar manners to the server, such as in the form of XML code or in an HTTP request.

Along with passing such data to the checkout server, the computer may request a checkout screen for the checkout server, and may display such a screen to the user, with fields in the screen populated with data corresponding to the transaction. At box 422, the user interacts with the checkout screen to provide transaction information that is needed by the process, and ultimately indicates an intent to complete the transaction.

Referring now to FIG. 4C, the process 430 is similar to the process 410 of FIG. 4B, but includes additional information regarding actions that may occur during the rendering of a merchant web page and the interaction with the merchant web page.

At box 432, a client device gets a web page, such as from a merchant web server. At box 434, the device renders the page and gets a script or other program code that is pointed to by an element on the page. At box 436, the device has retrieved the script and it runs the program code associated with the script.

The script in this example is programmed to parse the web page, such as by parsing a DOM tree of the web page, to identify particular tags on the page. As shown by box 438, microformat tags on the page are identified. The program code then adds event handlers to the page, at box 440. If the page has been fully parsed for microformats, box 441, then the process waits for actions from the user, at box 442. If not all microformats have been parsed, the process 430 returns to identifying microformats and adding event handlers associated with the microformats.

After a period of time, a user interacts with the page, resulting in an action associated with one of the added event handlers. Such action may include an indication that the user wishes to add an item to a shopping cart, as indicated by decision box 444. If they wish to do so, then the item can be discovered as shown by box 445 by identifying the event handler that was triggered by the user's selection and associating it with a particular item and related information (e.g., description, size, and price). A shopping cart may then be created and/or updated as shown by box 446. When a page is initially rendered, it would not be expected that a shopping cart would exist, and the same would be true if a user closed an existing shopping cart, so in such situations the shopping cart would need to be created. If an item had already been selected, then the cart will have already been generated, and will simply need updating. The process then waits for a next user action.

If the selection was not an "add to cart" type of selection, the process may determine whether the user has selected a "checkout" control (box 447). If the user has not, the process may return to waiting for another action, under the assumption that whatever action occur was not a shopping-related action. Alternatively, if the action is determined to be shopping related but does not call for adding an item to a cart or checking out, another action may be performed or an error message may be generated. As one example, a user action could include a selection to show sales tax and/or shipping to a displayed shopping cart before checking out, or for editing a cart such as to remove an item from the cart.

If the selected action indicates an intent by the user to check out, the device may gather data related to the shopping cart such as information identifying items in the shopping cart and the quantity of items, among other things, and may submit such information to a checkout server as shown by box 448. The gathering of such information may occur in a variety of manners, such as by checking a cookie that has been maintained during the session to track items selected by the user.

At box 450 the user interacts with a checkout server in a familiar manner, such as by providing HTTP requests and receiving responses. Such interaction may involve the user providing shipping and identifying information for completing the transaction.

Figure 5:
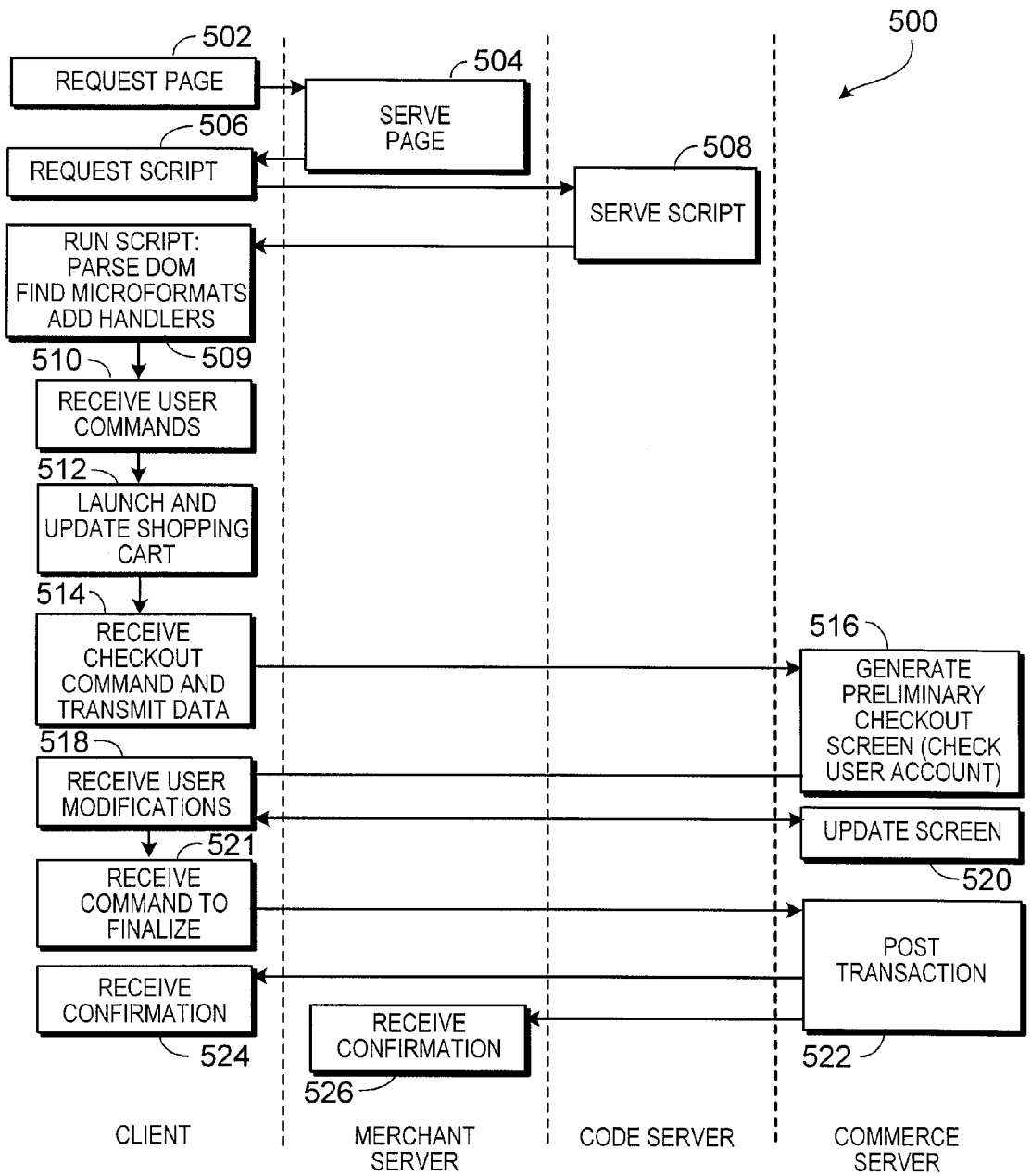
FIG. 5 is a swim lane diagram of a process for processing a purchase from a merchant web page.

FIG. 5 is a swim lane diagram of a process 500 for processing a purchase from a merchant web page. This process 500 is similar to the processes shown in FIGS. 4B and 4C, but is shown to emphasize examples of which particular actions may be performed using components in a system.

At box 502, a client device, such as a computer operating a web browser, requests a web page from a merchant server. At box 504, the server serves the page which may be a simple page having basic mark up code and little complex code or other such programming information. At box 506, the client receives the web page and begins rendering it, upon which it identifies a script tag on the page that points to a code server. The client then requests the particular program code, in the form of a script from the code server, and the code server serves the script back to the client, as shown at box 508.

Such fetching of the script may occur while the client continues to interpret and display the web page, and when the script is returned, as shown at box 509, the script may cause the client to parse the web page DOM, to find microformats or other appropriate tags on the page, and to add event handlers or similar objects for tracking interaction with the page, at the client.

The client may then wait for the user to interact with the web page, and at box 510 receives commands from a user of the client. Such commands may include selection of shopping-related items on the page. In response to such commands, the client may refer to the program code represented by the script or related program code that may be established to form and update a shopping cart associated with the page, as shown by box 512.

At box 514, the user has completed interacting with the page and has indicated in interest to complete a shopping transaction, such as by selecting a checkout button. Such a selection may cause a reference to be made to the program code which may then obtain data reflecting the contents of a shopping cart, and pass that data to a commerce server. A commerce server, as shown at box 516, may then generate a preliminary checkout screen using the information it received. For example, the commerce server may initially show data relating to the checkout cart, and may also display a blank form for the user to fill in payment and shipping information. Alternatively, if the commerce server can determine an identity of the client such as where the client has logged on with the commerce server in the current session, the commerce server may populate a checkout page using stored information.

At box 518, a user may provide modifications to the checkout screen to the client, and the client may pass those modifications to the commerce server, which may then update the screen, as shown at box 520. Such modifications may continue to occur until the user is comfortable with the content of the checkout screen and wishes to finalize the transaction, as shown at box 521. Such finalization intent may be signaled by a user selection of a finalize button, which may cause the commerce server to complete the transaction.

The process of completing the transaction may involve the commerce server causing money to be credited to the merchant and taken from the user of the client device, which may occur by a variety of mechanisms. In addition, in posting the transaction, at box 522, the commerce server may cause notifications (e.g., a confirmation) to be sent to the merchant, as shown at box 526, and to the user of the client device, as shown at box 524. The notification to the merchant may occur in a variety of manners, such as by transfer of XML data to the merchant, or by posting information about the transaction on a web page associated with the commerce server that the merchant may later access. Notification to the user may occur also in a variety of manners, including by e-mail confirmation that includes a link that may connect the user back to information about the transaction when the link is selected.

Figure 6:
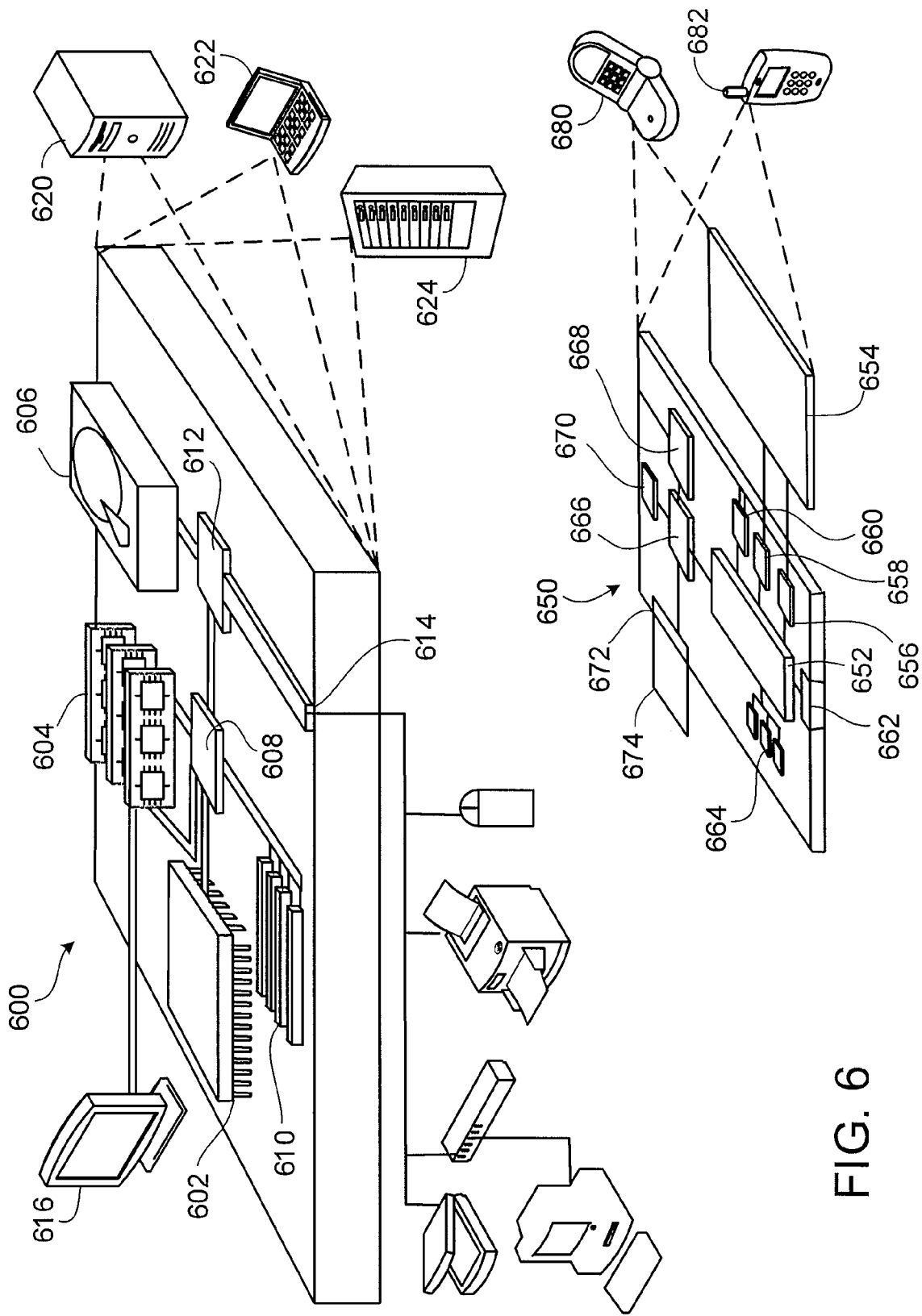
FIG. 6 shows an example of a generic computer device and a generic mobile computer device.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Also, although several applications of the payment systems and methods have been described, it should be recognized that numerous other applications are contemplated. Moreover, although many of the embodiments have been described in relation to a so-called shopping cart, that term should be understood to include various forms of mechanisms for presenting an organized grouping of items or services that a user has selected for possible purchase, and can include such descriptions as shopping baskets and the like. Accordingly, other embodiments are within the scope of the following claims.

What is claimed is:

1. A computer-implemented method, comprising:
   accessing, with a user computing device, a web-based document from a first party containing a mark-up code segment referencing a second party;
   processing the web-based document to cause execution of the mark-up code segment, to automatically create a request for a program for generating a shopping application for the web-based document;
   receiving the program from the second party;
   using the received program to:
      identify one or more arguments from within at least one tag of the web-based document, the arguments corresponding to one or more elements indicating items for sale; and
      add to the web document, at least one event handler associated with the one or more identified arguments; and
   generating a shopping cart containing information about an item for sale upon triggering of the at least one event handler, the shopping cart being generated by code that is added to a document object model of the web-based document after processing of the web-based document has occurred, wherein the item for sale in the shopping cart includes a price that corresponds to the one or more arguments within the at least one tag;
   wherein portions of the information in the shopping cart are dynamically updated and displayed in a common content area with the web-based document data.

2. The method of claim 1, further comprising using the loaded program to add to the web-based document an event handler and parsing specified portions of the web-based document in response to the occurrence of an event.

3. The method of claim 1, further comprising parsing the web-based document to identify meta-data tags and adding the event handlers for those meta-data tags.

4. The method of claim 3, wherein the meta-data tags comprise item microformat elements.

5. The method of claim 3, wherein the meta-data tags include custom tags that include content to be passed back to the first party.

6. The method of claim 1, further comprising receiving a checkout command and passing content from the shopping cart to a commerce server.

7. The method of claim 6, wherein the shopping cart content is stored in a cookie on the user device.

8. The method of claim 7 wherein the shopping cart content is encrypted to prevent interference by the user with the content.

9. The method of claim 8, wherein the shopping cart content is passed to an open commerce API.

10. The method of claim 1, wherein adding the event handlers comprises editing the web-based document's DOM.

11. The method of claim 1, wherein the web-based document is authored using substantially only HTML.

12. The method of claim 1, wherein the generated shopping cart is non-persistently displayed in a common content area with the web-based document for a predetermined period of time after receiving a user action relating to the purchase of items.

13. The method of claim 1, wherein loading the received program comprises parsing the web-based document to identify meta-tags that provide context for the shopping application.

14. The method of claim 1, wherein the portions of information comprise user-selected product options.

15. The method of claim 13, wherein loading the received program further comprises decorating one or more identified meta-tags on the web-based document.

16. A non-transitory recordable media having recorded and stored thereon computer instructions that, when executed, perform the actions of:
   accessing, with a user computing device, a web-based document from a first party containing a mark-up code segment referencing a second party;
   processing the web-based document to cause execution of the mark-up code segment, to automatically create a request for a program for generating a shopping application for the web-based document;
   receiving the program from the second party;
   using the received program to:
      identify one or more arguments from within at least one tag of the web-based document, the arguments corresponding to one or more elements indicating items for sale; and
      add to the web document, at least one event handler associated with the one or more identified arguments; and
   generating a shopping cart containing information about an item for sale upon triggering of the at least one event handler, the shopping cart being generated by code that is added to a document object model of the web-based document after processing of the web-based document has occurred, wherein the item for sale in the shopping cart includes a price that corresponds to the one or more arguments within the at least one tag;
   wherein portions of the information in the shopping cart are dynamically updated and displayed in a common content area with the web-based document data.

17. The media of claim 16, wherein generating a shopping cart comprises creating an iframe containing shopping cart information in a common content area with the web-based document.

18. The media of claim 16, further comprising identifying a custom event tag and passing labels associated to a commerce server upon an indication by a user to checkout.

19. The media of claim 18, wherein the custom event tag comprises a merchant-specific transaction identifier.

20. The media of claim 16, further comprising code that performs the action of retrieving a shopping cart generation program using a URL in the code.

21. A system, comprising:
   one or more computers and one or more storage devices storing instructions that are operable, when executed by the one or more computers, to cause the one or more computers to perform operations comprising:

accessing, with a user computing device, a web-based document from a first party containing a mark-up code segment referencing a second party;
processing the web-based document to cause execution of the mark-up code segment, to automatically create a request for a program for generating a shopping application for the web-based document;
receiving the program from the second party;
using the received program to:
 identify one or more arguments from within at least one tag of the web-based document, the arguments corresponding to one or more elements indicating items for sale; and
 add to the web document, at least one event handler associated with the one or more identified arguments; and
generating a shopping cart containing information about an item for sale upon triggering of the at least one event handler, the shopping cart being generated by code that is added to a document object model of the web-based document after processing of the web-based document has occurred, wherein the item for sale in the shopping cart includes a price that corresponds to the one or more arguments within the at least one tag;
 wherein portions of the information in the shopping cart are dynamically updated and displayed in a common content area with the web-based document data.

22. The system of claim 21, wherein the one or more computers generate a visual display of a shopping cart in response to triggering of the event handlers.

23. The system of claim 21, wherein the one or more computers transmit data corresponding to the file to a payment server for completing a transaction between a user viewing the web-based document and a merchant associated with the mark-up code document.

24. The system of claim 23, wherein the system is programmed to transmit to the payment server a merchant identifier and a user identifier.

25. The system of claim 21, further comprising a visual shopping cart generated in response to user interaction with a web page generated by the mark-up code segment, and adapted to display items selected by a user for purchase.

\* \* \* \* \*